(12) United States Patent
Riffeser (10) Patent No.: US 11,369,086 B1
(45) Date of Patent: Jun. 28, 2022

(54) MULTI-LENGTH LEASH

(71) Applicant: Angelina Riffeser, Monaco (MC)

(72) Inventor: Angelina Riffeser, Monaco (MC)

( * ) Notice: Subject to any disclaimer, the term of this patent is extended or adjusted under 35 U.S.C. 154(b) by 0 days.

(21) Appl. No.: 17/566,049

(22) Filed: Dec. 30, 2021

(51) Int. Cl.
 *A01K 27/00* (2006.01)

(52) U.S. Cl.
 CPC .......... *A01K 27/003* (2013.01); *A01K 27/005* (2013.01)

(58) Field of Classification Search
 CPC ... A01K 37/003; A01K 27/004; A01K 27/005
 See application file for complete search history.

(56) References Cited

U.S. PATENT DOCUMENTS

| | | | | |
|---|---|---|---|---|
| 5,038,719 A * | 8/1991 | McDonough | ........ | A01K 27/003 119/772 |
| 5,873,328 A * | 2/1999 | Campbell | ............ | A01K 27/005 119/798 |
| 5,915,336 A * | 6/1999 | Watson | ................ | A01K 27/003 119/797 |
| 7,467,604 B1 * | 12/2008 | Werner | ................ | A01K 27/005 119/770 |
| 8,448,608 B2 * | 5/2013 | Mucerino, Jr. | ...... | A01K 27/005 119/797 |
| 2009/0301404 A1 | 12/2009 | Tanaya | | |
| 2010/0037833 A1 * | 2/2010 | Joung | .................. | A01K 27/005 119/798 |
| 2011/0011352 A1 * | 1/2011 | Lee | ...................... | A01K 27/004 119/797 |
| 2013/0074783 A1 * | 3/2013 | Chapin | ................ | A01K 27/004 119/796 |
| 2013/0192539 A1 * | 8/2013 | Woodruff | ............. | A01K 27/005 119/798 |
| 2016/0135430 A1 * | 5/2016 | Noonan | ............... | A01K 27/003 119/797 |
| 2016/0262353 A1 * | 9/2016 | Arnold | ................. | A01K 27/005 |
| 2016/0338322 A1 * | 11/2016 | Letke | ................... | A01K 27/003 |
| 2017/0142934 A1 * | 5/2017 | Evans | ................. | A01K 27/008 |
| 2017/0367303 A1 * | 12/2017 | Bitar | ..................... | A01K 27/003 |
| 2020/0329676 A1 * | 10/2020 | Sanchies | ............. | A01K 27/004 |
| 2021/0212291 A1 * | 7/2021 | Su | ........................ | B60R 22/10 |

OTHER PUBLICATIONS

Amazon—Canple Dog Leash multifunctional with car seat belt buckle for medium to large dogs no pull shock absorbing strong bungee reflective dog training leash 4-6 t 2 padded traffic handle. https://www.amazon.com/Canple-multifuctional-Absorbing-Reflective-Training/dp/B08JPKR466/. Retrieved Dec. 30, 2021.

* cited by examiner

*Primary Examiner* — Kristen C Hayes
(74) *Attorney, Agent, or Firm* — Diament Patent Law, P.C.; Adam Diament (57) ABSTRACT

A multi-length leash is disclosed that comprises a handle, a line member, and an elastic member. The first end of a first region of the line member is secured to a closed bracket of a leash connector, and the second end is secured to the first stop of a second region. The first end of the elastic member is directly connected with both the handle and first connecting member, and at least the second end is directly secured to the second connecting member that slidably engages with the second region at the second stop. The elastic member is configurable in one of at least a first state or a second state to alter an effective length of the multi-length leash.

18 Claims, 4 Drawing Sheets

MULTI-LENGTH LEASH

CROSS-REFERENCE TO RELATED APPLICATIONS

None.

FIELD OF THE DISCLOSURE

The present invention relates to a safety leash, and more specifically, to a multi-length leash with bypass features to allow the leash to have different lengths.

BACKGROUND OF THE INVENTION

Typically, a leash is a line that allows a user to lead or control the movement of a subject. For example, a pet owner uses the leash to walk a pet, or a parent uses the leash as a child harness to restrain the movement of a child in a mall or a crowded place. In accordance with different scenarios, the user may want to use an adjustable leash that can be used in different versions. In one version, a short leash is preferred for a restricted span of movement of the subject, for example, walking the pet on the sidewalk, close to vehicles, bicycles, or other possible dangers. On the other hand, in another version, a full-length leash may be preferred for a greater span when the pet wants to step away a few steps into nature to find the right spot.

An example of an adjustable leash is disclosed in U.S. Pat. No. 7,467,604 (hereinafter, "Werner") that is directed to a hands-free dog leash that enables the dog to move side to side through a pulley attachment and includes anti-tangling swivel mechanisms and safety mechanisms. Another example of the adjustable leash is disclosed in U.S. Patent Application Pub. No. 2009/0301404A1 (hereinafter, "Tanaya") that is directed to a dog walking belt for a dog having the habit of pulling the owner. In accordance with both the above exemplary adjustable leashes, the mechanism is quite complicated and time-consuming due to which changing the version of the leash becomes troublesome for the user. Additional leash material is also required for adjusting the leash increases the cost of the leash for the user. Furthermore, current leashes do not give users the option of expanding and changing the length of the leash for the dog walker. Rather, the above examples focus on the shock absorbant function to relieve neck pain to the main. While offering a hands free leash, these leashes do not offer a variation in the span of the length. Still, there remains a continuing need for improved leashes. All patent applications cited throughout this application are incorporated by reference in their entireties for all purposes.

BRIEF SUMMARY OF THE PRESENT INVENTION

The present invention provides a multi-length leash that comprises at least an elastic member configurable in one of a first state, a second state or a third state to alter an effective length of the multi-length leash.

In one aspect of the present invention, the invention provides the multi-length leash comprising a handle, an elastic member, and a line member. The line member has a first region and a second region. A first end of the first region is secured to a closed bracket of a leash connector, and a second end of the first region may be secured to a first stop of the second region. The elastic member is disposed between the handle and a second stop of the second region of the line member. A first end of the elastic member is directly connected with both the handle and a first connecting member. At least a second end of the elastic member is directly secured to a second connecting member that slidably engages with the second region of the line member at the second stop. The elastic member is in the first state when the first connecting member is disengaged from the second connecting member resulting in a first effective length of the multi-length leash, or in the second state when the first connecting member is engaged with the second connecting member resulting in a second effective length of the multi-length leash.

In accordance with an embodiment, the elastic member is further directly secured to one of one or more additional connecting members at one or more intermediate tabs along length of an elastic component of the elastic member. In such an embodiment, a portion of the elastic member is bypassed based on a direct connection between the first connecting member and one of the one or more additional connecting members. In such an embodiment, the elastic member is in a third state when the first connecting member is engaged with one of the one or more additional connecting members.

In accordance with an embodiment, the first effective length is greater than the second effective length and extends up to a maximum length of the multi-length leash based on a degree of stretchability of the elastic component of the elastic member and a pulling force applied at the leash connector. The third effective length corresponding to the third state is less than the maximum length based on the degree of stretchability of an engaged portion of the elastic component.

In accordance with an embodiment, a slidable member mounted orthogonally along with longitudinally arranged straps of the handle and proximally to the first connecting member, is adjusted to vary a loop size of the handle.

In accordance with an embodiment, the handle is a primary loop handle formed by bending back a strap and securing a first end of the strap with a second end of the strap or another position distant from the second end of the strap. The second end of the strap is secured to the first end of the elastic member that is further connected with the first connecting member.

In accordance with an embodiment, the second region is a looped region and secured to the second end of the first region at the first stop. The second region of the line member is a secondary loop handle held by a hand and results in a minimum length of the multi-length leash.

In accordance with an embodiment, the second connecting member temporarily and slidably engages with the second stop of the second region when the elastic member is in the second state. The second stop, circumferentially opposite to the first stop, is automatically determined when pulling force is applied at the leash connector and the second region is elongated.

In accordance with an embodiment, the first connecting member is one of a hook, a carabiner, a loop, a snap hook, or a spring-loaded loop. The second connecting member is one of a loop, a ring, a closed-loop bracket. The leash connector is removably secured to a receiving closed bracket of a collar, a halter, or a harness.

In accordance with an embodiment, the first region of the line member is made of nylon mesh, twine rope, leather, rubber cord, or chain link. The handle and the second region of the line member is made of nylon mesh, twine rope, leather, rubber, or chain link sheathed by a padded material.

In accordance with an embodiment, the elastic member corresponds to one of an elastic coil, a spring, a retractable member, or a bungee cord.

In another aspect of the present invention, the invention provides a multi-length leash comprising a handle, an elastic member, and a line member. The line member has a first region and a second region. A first end of the first region is secured to a closed bracket of a leash connector, and a second end of the first region is secured to a first stop of the second region. The elastic member, disposed between the handle and a second stop of the second region of the line member, is configurable in one of a first state, a second state, or a third state to vary an effective length of the multi-length leash. A first end of the elastic member is directly connected with both the handle and a first connecting member. One or more additional connecting members are secured along the length of an elastic component of an elastic member at one or more intermediate tabs between the first stop and a second stop. The elastic member or a portion of the elastic member is bypassed based on a direct connection between the first connecting member and a second connecting member or one of the one or more additional connecting members. The elastic member is in the first state when the first connecting member is disengaged from the second connecting member resulting in a first effective length of the multi-length leash, in the second state when the first connecting member is engaged with the second connecting member resulting in a second effective length of the multi-length leash, or in the third state when the first connecting member is engaged with one of the one or more additional connecting members resulting in a third effective length of the multi-length leash.

In accordance with an embodiment, the second effective length is greater than the first effective length and extends up to a maximum length of the multi-length leash based on a degree of stretchability of an elastic component of the elastic member and a pulling force applied at the leash connector. The third effective length is less than the maximum length based on the degree of stretchability of an engaged portion of the elastic component.

In yet another aspect of the present invention, the invention provides a method for using a multi-length leash. The method comprises securing a leash connector of a line member of the multi-length leash to a receiving closed bracket. The method further comprises directly connecting a first connecting member, proximal to a handle of the multi-length leash, with one of a second connecting member or one of one or more additional connecting members resulting in a desired effective length of the multi-length leash. The second connecting member is proximal to the line member and the one or more additional connecting members are secured along the length elastic component of the elastic member at one or more intermediate tabs. The elastic member, disposed between the handle and the line member of the multi-length leash, is in one of a first, a second, or a third state.

In accordance with an embodiment, the first connecting member is directly connected to a first end of the elastic member connected with the handle.

In accordance with an embodiment, the second connecting member is directly connected to a second end of the elastic member connected with a looped region of the line member.

In accordance with an embodiment, the method further comprises holding the multi-length leash from a second region of the line member resulting in a minimum length of the multi-length leash.

In accordance with an embodiment, the elastic member is in the first state when the first connecting member is disengaged from the second connecting member resulting in a first effective length of the multi-length leash.

In accordance with an embodiment, the elastic member is in the second state when the first connecting member is engaged with the second connecting member resulting in a second effective length of the multi-length leash. The elastic member is in the third state when the first connecting member is engaged with one of the one or more additional connecting members resulting in a third effective length of the multi-length leash.

DETAILED DESCRIPTION OF EMBODIMENTS

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practised in the absence of any elements that are not specifically disclosed herein.

Figure 1A:
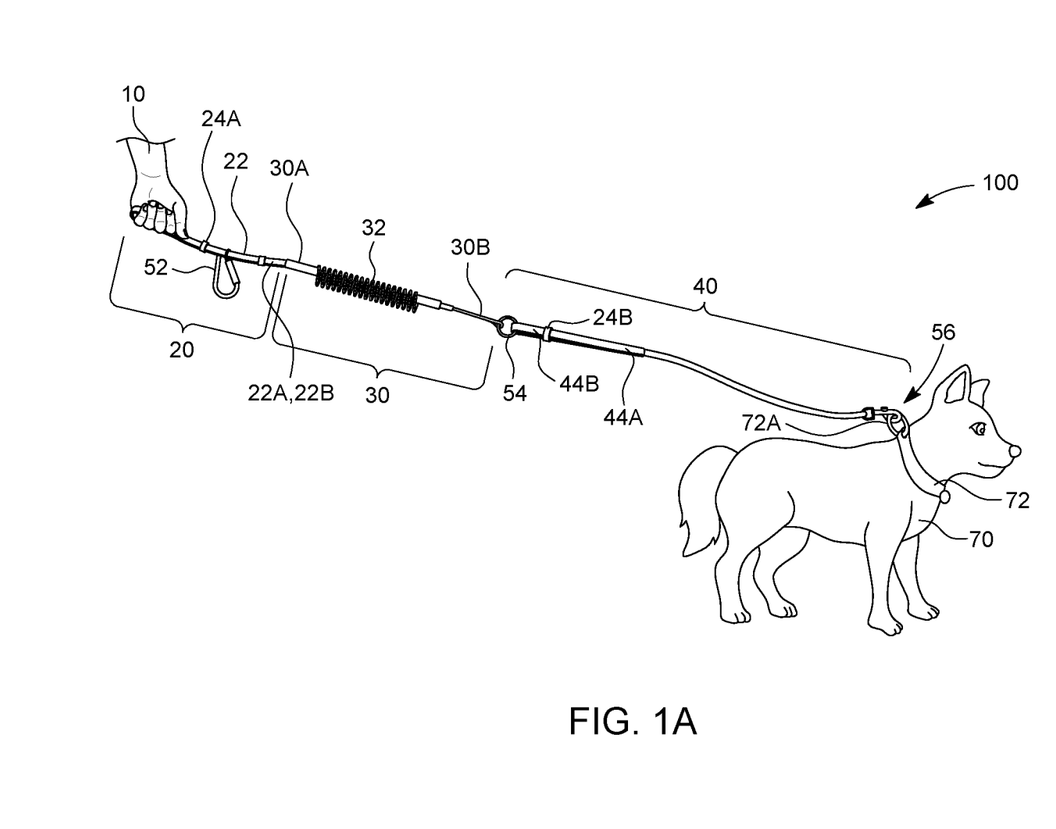
FIGS. 1A, 1B, and 1C depict perspective views of a multi-length leash and its components, in accordance with an embodiment of the present disclosure.
Figure 1B:
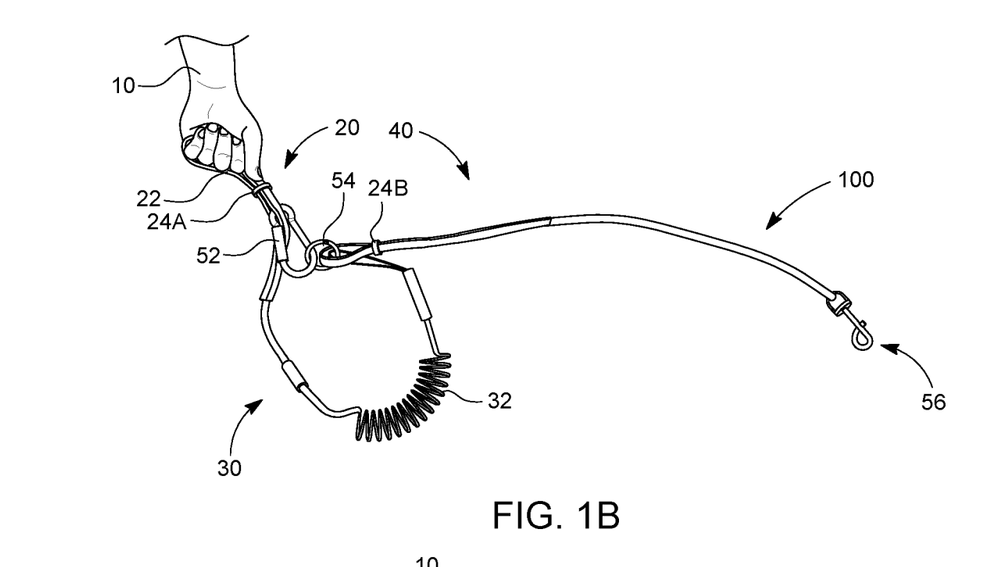
Figure 1C:
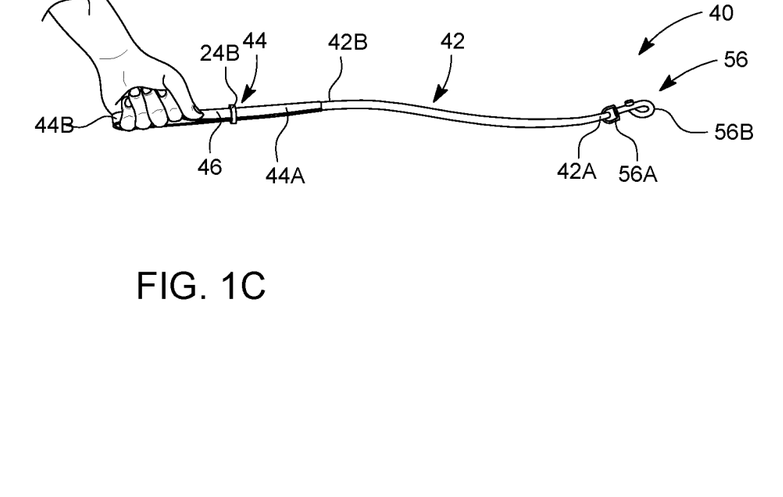

Turning to the Figures, FIGS. 1A, 1B, and 1C depict perspective views of a multi-length leash 100 and its components, in accordance with an embodiment of the present disclosure. The multi-length leash 100 comprises a handle 20, an elastic member 30, and a line member 40. The multi-length leash 100 further comprises a first connecting member 52 and a second connecting member 54. One end, hereinafter referred to as proximal end, of the multi-length leash 100 may be held by hand 10 of a user, and the other end, hereinafter referred to as distal end, of the multi-length leash 100 is connected to a leash connector 56.

In accordance with an embodiment, as shown in FIG. 1A, the handle 20 is a primary loop handle formed by bending back an elongated strap 22 and securing the first end 22A of the strap 22 with a second end 22B (which is the opposite end) of the strap 22, in an overlapping manner. The handle 20 may be adapted to receive hand 10 of a user (such as a pet owner, a parent, a guardian or a caretaker) therethrough so that the user can easily hold the multi-length leash 100. When the multi-length leash 100 is secured to a receiving bracket 72A of a collar 72 of a subject 70 (such as a pet, a child, or a specially abled person) using the leash connector 56, the pulling force on the multi-length leash 100 and the direction of the pull may cause the user's hand 10 to slip automatically to the extreme end (opposite to the leash connector 56) of the handle 20. The collar 72 may be replaced by a halter or a harness without any deviation from the scope of the disclosure. By way of non-limiting examples, the handle 20 may be made of nylon mesh, twine rope, leather, rubber, or chain link sheathed by a padded material. The handle 20 may additionally include the padding or cushioning thereon to provide the user with a comfortable grip.

In accordance with another embodiment, handle 20 may be formed by folding back first end 22A of the strap 22 and fixing it at a position on the strap 22, distant from the second end 22B of the strap 22, thereby forming a loop. In such embodiments, the first end 22A may be secured to the second end 22B or at the position distant from the second end 22B by various means, for example, stitching an X-box stitch on the overlapping ends 22A and 22B or just the second end 22B (when the first end 22A is placed over the position distant from the second end 22B on the strap 22), using adhesive, or other suitable fasteners.

The second end 22B of the strap 22 may be secured to a first end 30A of the elastic member 30. The second end 22B of the strap 22 may be secured to the first end 30A of the elastic member 30 by various means, for example, X-box stitches, adhesive, or other suitable fasteners.

The second end 22B of the strap 22 may be further connected with the first connecting member 52. In accordance with an embodiment, the first connecting member 52 may be permanently secured to the second end 22B of the strap 22. As depicted in FIGS. 1A and 1B, the first connecting member 52 is right by the second end 22B of the strap 22, which makes it easy, quick, and convenient for the user to use the first connecting member 52 and to clip onto (or connect with) various regions and other connectors, such as the second connecting member 54, of the multi-length leash 100. By way of non-limiting examples, the first connecting member 52 is one of a hook, a carabiner, a loop, a snap hook, a spring-loaded loop or other similar locking fastening device commonly used in leashes that can be easily opened and closed by the user.

In accordance with an embodiment, a slidable member 24A, mounted orthogonally along with the longitudinally arranged straps of the handle 20 and proximally to the first connecting member 52, may be adjusted to vary the loop size of the handle 20.

The line member 40 of the multi-length leash 100 has a first region 42 and a second region 44. A first end 42A of the first region 42 may be secured to a closed bracket 56A of the leash connector 56, and a second end 42B (which is the opposite end) of the first region 42 is secured to a first stop 44A of the second region 44. Leash fastener 56B (such as a hook, a carabiner, a loop, a snap hook, or a spring-loaded loop) of the leash connector 56 may be removably secured to the receiving closed bracket 72A of the collar 72 worn by the subject 70. The first end 42A of the first region 42 may be secured to the closed bracket 56A of the leash connector 56 by inserting the first end 42A through the closed bracket 56A, bending back and fixing the first end 42A at the nearest portion of the first region 42 by various means, for example, stitching, adhesive, or other suitable fasteners. By way of non-limiting examples, the first region 42 of the line member 40 is made of nylon mesh, twine rope, leather, rubber cord, or chain link.

In accordance with an embodiment, the second region 44 is a looped region and may be formed by securing the two terminal ends of an elongated strap 46 together, and further permanently secured to the second end 42B of the first region 42. The elongated strap 46 may be secured by various means, such as stitching, adhesive, or other suitable fasteners, to provide extra strength to the joint where the first region 42 is secured to the terminal ends of the elongated strap 46 of the second region 44. Consequently, the second region 44 gets secured to the second end 42B of the first region 42 at the first stop 44A. In accordance with an embodiment, the second region 44 of the line member 40 is a secondary loop handle that can be held by the hand 10 in case the user wants a short leash or move the subject 70 closer in case of a particular situation, such as while entering an elevator.

In accordance with an embodiment, the second connecting member 54 may temporarily and slidably engage with the second stop 44B along the elongated strap 46 of the second region 44. The second stop 44B may be located circumferentially opposite to the first stop 44A. The second stop 44B may be automatically determined when a pulling force is applied at the leash connector 56 and the second region 44 is completely elongated. The second connecting member 54 may be one of a loop, a ring, a closed-loop bracket, a carabiner, latch, or equivalent, which may be selectively openable or closed. By way of non-limiting examples, the second region 44 of the line member 40 is made of nylon mesh, twine rope, leather, rubber, or chain link sheathed by a padded material.

The elastic member 30 is disposed between the handle 20 and the second stop 44B of the second region 44 of the line member 40. The disposition of the elastic member 30 is close to the handle 20 to make it easy, quick, and convenient for the user to grab, and bypass the elastic member 30 completely (as depicted in FIG. 1B) or partially (in accordance with the arrangement in FIG. 2) to alter the effective length of the multi-length leash 100 based on the user requirement.

The elastic member 30 may include an elastic component 32, such as an elastic coil, a spring, a retractable member, a bungee cord, or the like. It may be noted that the degree of stretchability of the elastic component 32 is dependent on a variety of spring parameters. For example, one spring parameter may be the flexibility that may be defined as having a modulus of elasticity E (which is the measure of the elastic ability of the elastic component 32) not greater than about $2 \times 10^3$. Stiffness greater than such value may not be desired. Other spring parameters maybe strength and resiliency that may be such that the elastic component 32 can be stretched to 150% of its unstressed length. It may be noted that the above examples should not be construed to limit the scope of the disclosure, and such spring parameters may vary based on the type of material of the elastic component 32.

The first end 30A of the elastic member 30 may be directly connected with both the handle 20 and the first connecting member 52. The first end 30A of the elastic member 30, the overlapping ends 22A and 22B of the strap 22 (or just the second end 22B when the first end 22A is placed over the position distant from the second end 22B on the strap 22) and the base of the first connecting member 52 may be directly connected with each other via one or more means, for example, stitching, adhesive, or other suitable fasteners, or a combination thereof.

A second end 30B (which is the opposite end) of the elastic member 30 may be directly secured to the second connecting member 54 that slidably engages with the second region 44 of the line member 40 at the second stop 44B. In accordance with an embodiment, the second end 30B of the elastic member 30 may be a looped region, through which the second connecting member 54, such as a carabiner, may be passed and thereafter locked.

In operation, the leash connector 56, at the first end 42A of the first region 42 of the line member 40 of the multi-length leash 100, may be secured to the receiving closed bracket 72A of the collar 72. The collar 72 (replacable by the halter or the harness) may be worn by the subject 70, for example, a pet dog. The handle 20 may be adapted to receive the hand 10 of the user (such as a pet owner) therethrough so that the user can easily hold the multi-length leash 100, as depicted in FIG. 1A.

Once secured, the elastic member 30 may be configurable in one of at least a first state or a second state to alter an effective length of the multi-length leash 100. In accordance with an embodiment, the elastic member 30 may be in the first state when the first connecting member 52 is disengaged from the second connecting member 54, as depicted in FIG. 1A. In the first state, the effective length of the multi-length leash 100 may correspond to a resulting first effective length of the multi-length leash 100. As the elastic member 30 is not bypassed, the first effective length may correspond to a length from a proximal point of the handle 20 till the distal leash connector 56 is secured with the line member 40. In addition to the lengths of the handle 20, the elastic member 30 in a stretched state, and the line member 40, the first length also includes the diametrical lengths of the first connecting member 52 and the second connecting member 54. In such an embodiment, the first effective length extends up to a maximum length of the multi-length leash 100 based on a degree of stretchability of the elastic component 32 and a pulling force applied by the subject 70 at the leash connector 56. The size of the elastic component 32 may be in accordance with the size and weight of the subject 70 and also, the height of the user, and may be shorter or longer than the span of the user's arms.

As the arm span of a person is approximately equal to his/her height, accordingly, a suitable length of the multi-length leash 100 equivalent to the user's height, such as 163 cm-176 cm, may enable the user to easily grab the secondary loop handle without any hassle and pull the subject 70 close in case of any emergency. Having the length of the elastic component 32 being no longer than arms length, combined with the other elements of the embodiments has the advantage of increasing safety, because an elastic component that is too long allows an animal too much free range while being walked, and does not allow a person to pull in the animal in case of emergency. An elastic component that is too long would require the person to grab the beginning and end of the leash where there is no spiral, leading to decreased safety for the person and the animal, if the animal were to require immediate pulling back.

In a preferred embodiment the length from the handle to the end of the elastic component 32 is 20 cm less than the height of the person.

For example, in one embodiment, users that are 140 cm to 160 cm may prefer a leash of approximately 120 cm from the handle to the end of the elastic component 32 when stretched to the maximum. In another embodiment, users that are 160 cm to 180 cm may prefer a leash of approximately 140 cm from the handle to the end of the elastic component 32 when stretched to the maximum. In yet another embodiment, users that are 180 cm to 200 cm may prefer a leash of approximately 160 cm from the handle to the end of the elastic component 32 when stretched to the maximum. As described above, the maximum length from the handle to the end of the elastic component, when stretched to its maximum may be between 120 cm to 180 cm. However, other lengths may work without detracting from the spirit of the invention depending on the height of the user and/or preferred length. Shorter lengths of the elastic component 32 may also be used, such as a maximum length of 50 cm from the handle to the end of the elastic such that a range of embodiments may be between 50 cm and 180 cm from the handle to the elastic component 32.

In accordance with another embodiment, the first connecting member 52, proximal to the handle 20 of the multi-length leash 100, may be directly connected with the second connecting member 54 resulting in a desired effective length of the multi-length leash 100. Accordingly, the elastic member 30 may be in the second state when the first connecting member 52 is engaged with the second connecting member 54, as depicted in FIG. 1B. In the second state, the effective length of the multi-length leash 100 may correspond to a second effective length of the multi-length leash 100. As the elastic member 30 is completely bypassed based on a direct connection between the first connecting member 52 and the second connecting member 54, the second effective length may correspond to a length from a proximal point of the handle 20 till the first connecting member 52 and a length from second stop 44B of the second region 44 of the line member 40 till the distal leash connector 56 secured with the line member 40. In addition to the lengths of the handle 20 and the line member 40, the second length also includes the diametrical lengths of the first connecting member 52 and the second connecting member 54. Based on the description provided above, the second effective length is lesser than the first effective length, as the first length includes additional length provided by stretched elastic component 32 of the elastic member 30.

In accordance with another embodiment, as depicted in FIG. 1C, the user may unlock the second connecting member 54, and disengage the handle 20 and the elastic member 30 from the line member 40 of the multi-length leash 100, as depicted towards the left side of FIG. 1C. In such an embodiment, the second region 44 of the line member 40 may serve as a secondary loop handle. Similar to the handle 20, the second region 44 of the line member 40 may be adapted to receive the hand 10 of the user (such as a pet owner) therethrough so that the user can easily hold the multi-length leash 100, as depicted towards the right side of FIG. 1C. Another slidable member 24B may be mounted orthogonally along with the longitudinally arranged straps of the second region 44. The other slidable member 24B may be adjusted to vary the loop size of the second region 44 when held by the hand 10 of the user. The multi-length leash 100 in such a configuration may result in a minimum length of the multi-length leash 100 and may be preferable when the user wants to have the subject 70 at the closest distance, in case while entering the elevator, walking in a crowded area, or restraining the subject 70 (such as a dog) from attacking or being attacked.

Figure 2:
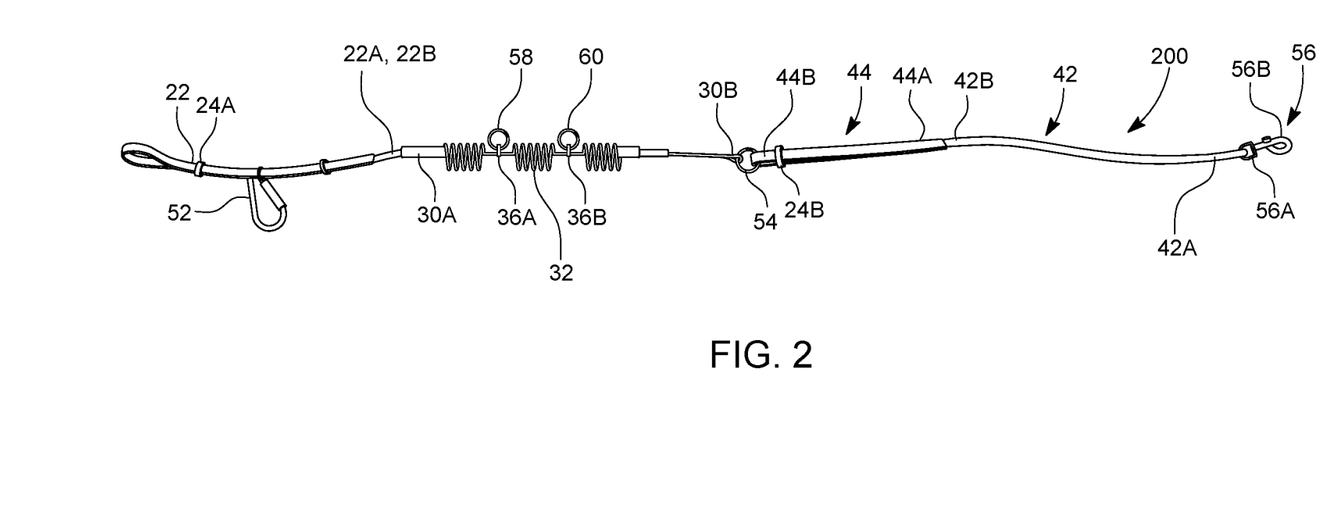
FIG. 2 depicts a perspective view of another multi-length leash and its components, in accordance with another embodiment of the present disclosure.

FIG. 2 depicts a perspective view of a similar multi-length leash 200 and its components, in accordance with another embodiment of the present disclosure.

The similar multi-length leash 200, as depicted in FIG. 2, may include additional components, such as one or more additional connecting members, in addition to the handle 20, the elastic member 30, the line member 40, the first connecting member 52, the second connecting member 54, and the leash connector 56, as described above in FIGS. 1A to 1C. It may be noted that there are shown only two additional connecting members for simplicity, however, the similar multi-length leash 200 may include more than two additional connecting members, without any deviation from the scope of the disclosure. Accordingly, the first connecting member 52 of the similar multi-length leash 200 may be directly secured to the one or more additional connecting members, in addition to the second connecting member 54.

The one or more additional connecting members may include, for example, a third connecting member 58 and a fourth connecting member 60, that may be secured to the elastic member 30 along its length. In accordance with an embodiment, as depicted in FIG. 2, the third connecting member 58 and the fourth connecting member 60 may be secured at one or more intermediate tabs, for example two intermediate tabs 36A and 36B respectively, along the length of the elastic component 32. By way of non-limiting examples, the one or more additional connecting members may be one of a loop, a ring, a closed loop bracket, or a carabiner.

In accordance with an embodiment, the intermediate tabs 36A and 36B may be secured with the body of the elastic member 30 at predefined points. In an exemplary scenario, the predefined points may be at $\frac{1}{3}^{rd}$ and $\frac{2}{3}^{rd}$ of the length of the elastic component 32. Accordingly, a selective portion of the elastic member 30 may be effectively bypassed as desired by the user. The slidable member 24A may be mounted orthogonally along with the longitudinally arranged straps of the handle 20. The other slidable member 24B may be mounted orthogonally along with the longitudinally arranged straps of the second region 44.

In operation, when the leash connector 56 is secured at the first end 42A of the first region 42 of the line member 40 of the similar multi-length leash 200 to the receiving closed bracket 72A of the collar 72, the elastic member 30 may be further configurable in a third state, in addition to the first state or the second state to alter an effective length of the similar multi-length leash 200. In accordance with an embodiment, the elastic member 30 may be in the first state when the first connecting member 52 is disengaged from the second connecting member 54 and the one or more additional connecting members, i.e. the third connecting member 58 and the fourth connecting member 60. In the first state, the effective length of the similar multi-length leash 200 may correspond to a resulting first effective length of the similar multi-length leash 200. In such an embodiment, the first effective length extends up to the maximum length of the similar multi-length leash 200 based on a degree of stretchability of the elastic component 32 and a pulling force applied by the subject 70 at the leash connector 56, as described above in FIG. 1A. In addition to the lengths of the handle 20, the elastic member 30 in the stretched state, and the line member 40, the first length also includes the diametrical length of the first connecting member 52 and the second connecting member 54.

In accordance with another embodiment, the first connecting member 52, proximal to the handle 20 of the similar multi-length leash 200, may be directly connected with the second connecting member 54 resulting in a desired effective length of the similar multi-length leash 200. Accordingly, the elastic member 30 may be in the second state when the first connecting member 52 is engaged with the second connecting member 54. In the second state, the effective length of the similar multi-length leash 200 may correspond to a second effective length of the similar multi-length leash 200. As the elastic member 30 is completely bypassed based on a direct connection between the first connecting member 52 and the second connecting member 54, the second effective length may correspond to a length from a proximal point of the handle 20 till the first connecting member 52 and a length from the second connecting member 54 till the distal leash connector 56 secured with the line member 40. In addition to the lengths of the handle 20 and the line member 40, the second length also includes the diametrical length of the first connecting member 52 and the second connecting member 54. Based on the description provided above, the second effective length is lesser than the first effective length.

In accordance with yet another embodiment, the first connecting member 52, proximal to the handle 20 of the similar multi-length leash 200, may be directly connected with one of the one or more additional connecting members, for example the third connecting member 58, resulting in an intermediate effective length of the similar multi-length leash 200. Thus, a portion of the elastic member 30, from the first end 30A of the elastic member 30 till the third connecting member 58, is bypassed based on a direct connection between the first connecting member 52 and the third connecting member 58. Accordingly, the elastic member 30 may be in the third state when the first connecting member 52 is engaged with, for example, the third connecting member 58. In the third state, the effective length of the similar multi-length leash 200 may correspond to a third effective length. As the elastic member 30 is partially bypassed based on a direct connection between the first connecting member 52 and the third connecting member 58, the third effective length may correspond to a length from a proximal point of the handle 20 till the third connecting member 58 and a length from the third connecting member 58 till the distal leash connector 56 secured with the line member 40. In addition to the lengths of the handle 20, the elastic member 30 in partially stretched state, and the line member 40, the third length also includes the diametrical length of the first connecting member 52, the second connecting member 54, and the third connecting member 58. Based on the description provided above, the third effective length is less than the maximum length based on the degree of stretchability of an engaged portion of the elastic component 32, i.e. from the third connecting member 58 till the distal end of the elastic component.

Figure 3:
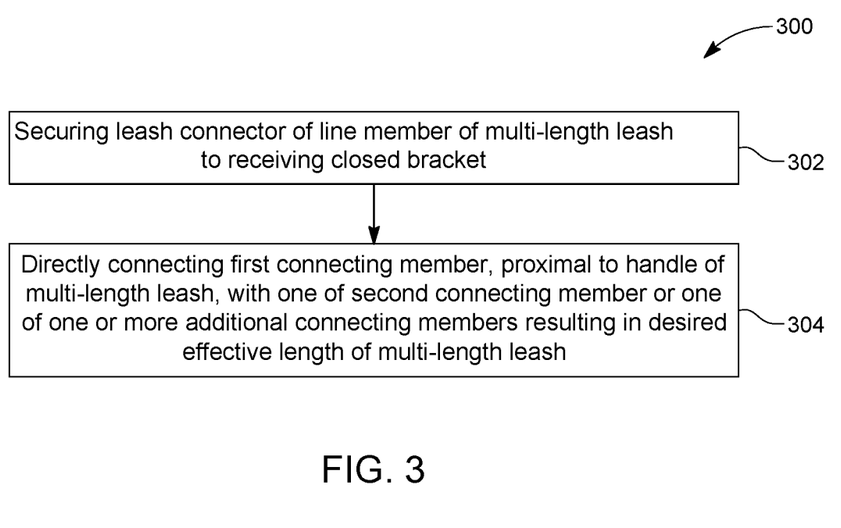
FIG. 3 depicts a set of operations for using a multi-length leash or a modified multi-length leash, in accordance with various embodiments of the present disclosure.

FIG. 3 depicts a set of operations, a method 300, for using the multi-length leash 100 or the similar multi-length leash 200, in accordance with various embodiments of the present disclosure.

At step 302, the leash connector 56 of the line member 40 of the multi-length leash 100 (or the similar multi-length leash 200) may be secured to the receiving closed bracket. In accordance with an embodiment, the user may secure the leash connector 56 of the line member 40 to the receiving closed bracket 72A of the collar 72. The collar 72 may be worn by the subject 70, for example a pet dog.

At step 304, the first connecting member 52, proximal to the handle 20 of the multi-length leash 100 (or the similar multi-length leash 200), may be directly connected with one of the second connecting member 54 (or one of the one or more additional connecting members, i.e. the third connecting member 58 and the fourth connecting member 60), resulting in a desired effective length of the multi-length leash 100 (or the similar multi-length leash 200).

In accordance with an embodiment, as depicted in FIG. 1B, the user may directly connect the first connecting member 52 with the second connecting member 54 resulting in a desired effective length of the multi-length leash 100. Accordingly, in accordance with various embodiments, the elastic member 30, disposed between the handle 20 and the line member 40 of the multi-length leash 100, maybe in one of the first or the second state.

In accordance with another embodiment, as depicted in FIG. 2, the user may also directly connect the first connecting member 52 with one of the one or more additional connecting members, i.e. the third connecting member 58 or the fourth connecting member 60. Besides, the user may also directly connect the first connecting member 52 with the second connecting member 54. Such different connections may result in a desired effective length of the similar multi-length leash 200. Accordingly, the elastic member 30, disposed between the handle 20 and the line member 40 of the similar multi-length leash 200, may be in one of the first, the second state, or the third state.

As described above, in an embodiment, the elastic member 30 is in the first state when the first connecting member 52 is disengaged from the second connecting member 104 resulting in a first effective length of the multi-length leash 100, as depicted in FIG. 1A, or the similar multi-length leash 200, as depicted in FIG. 2. In another embodiment, the elastic member 30 may be in the second state when the first connecting member 52 is engaged with the second connecting member 54 resulting in a second effective length of the multi-length leash 100, as depicted in FIG. 1B. In a similar manner, such an engagement results in the second effective length of the similar multi-length leash 200, the depiction of which is similar to FIG. 1B. In yet another embodiment, the elastic member 30 may be in the third state when the first connecting member 52 is engaged with one of the one or more additional connecting members, such as the third connecting member 58, resulting in a third effective length of the similar multi-length leash 200.

Further, in yet another embodiment, the user may hold the multi-length leash 100 (or the similar multi-length leash 200) from the second region 44 of the line member 40 resulting in a minimum length of the multi-length leash 100 (or the similar multi-length leash 200).

The embodiments provide for several advantages over the prior art. The existing adjustable leashes in the prior art are provided with complex mechanisms for changing the length of the leash. On the other hand, the multi-length leash (such as the multi-length leash 100 and the similar multi-length leash 200), as proposed in the present disclosure, is provided with a simple mechanism to adjust the length of the leash depending on the user requirement. For example, in one use case, the user may want a short leash where the subject 70 is more restrained, for example for keeping the subject 70 (for example, a pet) close walking beside the user on the sidewalk, as pet trainers recommend. In another use case, the user may want to release and expand the elastic coil to give the subject 70 more span, for example smell the grass and bushes without pulling the user back and forth and without the multi-length leash dragging on the ground or getting tangled between the limbs of the subject 70 as it moves places. For such use cases, the multi-length leash has a feature of an elastic member in the upper part (closest to the human's hand) that can be "clipped together" closed or released and controlled by the user per his requirement.

Further, the existing adjustable leashes in the prior art are high on cost, as such leashes include additional leash material or coupled with retractable complex mechanisms to change the length of the leash. On the contrary, the multi-length leash, as proposed in the present disclosure, requires only a simple fastening mechanism (such as a hook-and-ring or a set of carabiners) and an elastic member, due to which the multi-length leash is quite low on cost, hassle-free, and easy to use. Unlike the retractable leashes, the proposed multi-length leash neither comprises any additional device that controls the leash nor requires the cord to be thin, sharp and with the strength to harm the user, the subject, and others as well. Thus, the proposed multi-length leash is legal and safe to use.

Furthermore, some of the existing adjustable leashes in the prior art use a spiral member for the stretchable feature in adjustable leash, however, do not allow the user to control the movement subject in accordance with different user requirements, for example, walking the pet besides when entering an elevator, quickly pulling the subject in case of any danger, or extending the length only when the subject is in a safe area. Thus, such adjustable leashes with spiral members do not allow the user to decide whether or not to release the spiral member, and do not exist. In contrast, the multi-length leash, as proposed in the present disclosure, allows the user a complete control over the closure and release (fully or partially) of the spiral member, which is at the right position along the multi-length leash to have the release and close function. Thus, the proposed multi-length leash is less troublesome, tangle-free, and hygienic, as it does not drag on the ground as a normal long line leash would do. Further, as proper visibility is provided to any wear and tear of the multi-length leash as there isn't any hidden component in any casing, such a multi-length leash is quite user-friendly.

Thus, the proposed multi-length leash serves as both a regular short leash or a leash that expands when the user decides to give the subject some extra span, without dragging the leash on the ground (as in case of a regular long leash), worrying about getting it tangled between the limbs of the subject, without having the user to hold several circled layers of the regular long leash in the hand, and without having the user to think which leash (short or long) to take along before leaving the house.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A multi-length leash comprising:
   a) a handle;
   b) a line member having a first region and a second region, wherein a first end of the first region is secured to a closed bracket of a leash connector, and a second end of the first region is secured to a first stop of the second region; and,
   c) an elastic member, disposed between the handle and a second stop of the second region of the line member, configurable in one of at least a first state or a second state to alter an effective length of the multi-length leash,
      wherein a first end of the elastic member is directly connected with both the handle and a first connecting member,
      wherein at least a second end of the elastic member is directly secured to a second connecting member that slidably engages with the second region of the line member at the second stop, and,
      wherein the elastic member is in the first state when the first connecting member is disengaged from the second connecting member resulting in a first effective length of the multi-length leash, or in the second state when the first connecting member is engaged with the second connecting member resulting in a second effective length of the multi-length leash;
   wherein the elastic member is further directly secured to one of one or more additional connecting members at one or more intermediate tabs along length of an elastic component of the elastic member,
   wherein a portion of the elastic member is bypassed based on a direct connection between the first connecting member and one of the one or more additional connecting members.

2. The multi-length leash according to claim 1, wherein the elastic member is in a third state when the first connecting member is engaged with one of the one or more additional connecting members.

3. The multi-length leash according to claim 2, wherein the first effective length is greater than the second effective length and extends up to a maximum length of the multi-length leash based on a degree of stretchability of an elastic component of the elastic member and a pulling force applied at the leash connector,
   wherein a third effective length corresponding to the third state is less than the maximum length based on a degree of stretchability of an engaged portion of the elastic component.

4. The multi-length leash according to claim 1, wherein a slidable member, mounted orthogonally along with longitudinally arranged straps of the handle and proximally to the first connecting member, is adjusted to vary a loop size of the handle.

5. The multi-length leash according to claim 1, wherein the handle is a primary loop handle formed by bending back a strap and securing a first end of the strap with a second end of the strap or another position distant from the second end of the strap,
   wherein the second end of the strap is secured to the first end of the elastic member that is further connected with the first connecting member.

6. The multi-length leash according to claim 1, wherein the second region is a looped region and secured to the second end of the first region at the first stop,
   wherein the second region of the line member is a secondary loop handle held by a hand and results in a minimum length of the multi-length leash.

7. The multi-length leash according to claim 1, wherein the second connecting member temporarily and slidably engages with the second stop of the second region when the elastic member is in the second state,
   wherein the second stop, circumferentially opposite to the first stop, is automatically determined when pulling force is applied at the leash connector and the second region is elongated.

8. The multi-length leash according to claim 1, wherein the first connecting member is one of a hook, a carabiner, a loop, a snap hook, or a spring-loaded loop,
   wherein the second connecting member is one of a loop, a ring, a closed-loop bracket.

9. The multi-length leash according to claim 1, wherein the leash connector is removably secured to a receiving closed bracket of a collar, a halter, or a harness.

10. The multi-length leash according to claim 1, wherein the first region of the line member is made of nylon mesh, twine rope, leather, rubber cord, or chain link,
    wherein the handle and the second region of the line member is made of nylon mesh, twine rope, leather, rubber, or chain link sheathed by a padded material.

11. A multi-length leash comprising:
    a) a handle;
    b) a line member having a first region and a second region, wherein a first end of the first region is secured to a closed bracket of a leash connector, and a second end of the first region is secured to a first stop of the second region; and,
    c) an elastic member, disposed between the handle and a second stop of the second region of the line member, configurable in one of at least a first state or a second state to alter an effective length of the multi-length leash,
wherein a first end of the elastic member is directly connected with both the handle and a first connecting member,
wherein at least a second end of the elastic member is directly secured to a second connecting member that slidably engages with the second region of the line member at the second stop, and,
wherein the elastic member is in the first state when the first connecting member is disengaged from the second connecting member resulting in a first effective length of the multi-length leash, or in the second state when the first connecting member is engaged with the second connecting member resulting in a second effective length of the multi-length leash;
wherein a slidable member, mounted orthogonally along with longitudinally arranged straps of the handle and proximally to the first connecting member, is adjusted to vary a loop size of the handle.

12. The multi-length leash according to claim 11, wherein the elastic member is in a third state when the first connecting member is engaged with one of the one or more additional connecting members.

13. The multi-length leash according to claim 11, wherein the handle is a primary loop handle formed by bending back a strap and securing a first end of the strap with a second end of the strap or another position distant from the second end of the strap, wherein the second end of the strap is secured to the first end of the elastic member that is further connected with the first connecting member.

14. The multi-length leash according to claim 11, wherein the second region is a looped region and secured to the second end of the first region at the first stop,
wherein the second region of the line member is a secondary loop handle held by a hand and results in a minimum length of the multi-length leash.

15. A multi-length leash comprising:
a) a handle;
b) a line member having a first region and a second region, wherein a first end of the first region is secured to a closed bracket of a leash connector, and a second end of the first region is secured to a first stop of the second region; and,
c) an elastic member, disposed between the handle and a second stop of the second region of the line member, configurable in one of at least a first state or a second state to alter an effective length of the multi-length leash,
wherein a first end of the elastic member is directly connected with both the handle and a first connecting member,
wherein at least a second end of the elastic member is directly secured to a second connecting member that slidably engages with the second region of the line member at the second stop, and,
wherein the elastic member is in the first state when the first connecting member is disengaged from the second connecting member resulting in a first effective length of the multi-length leash, or in the second state when the first connecting member is engaged with the second connecting member resulting in a second effective length of the multi-length leash;
wherein the first connecting member is one of a hook, a carabiner, a loop, a snap hook, or a spring-loaded loop, wherein the second connecting member is one of a loop, a ring, a closed-loop bracket.

16. The multi-length leash according to claim 15, wherein the second connecting member temporarily and slidably engages with the second stop of the second region when the elastic member is in the second state,
wherein the second stop, circumferentially opposite to the first stop, is automatically determined when pulling force is applied at the leash connector and the second region is elongated.

17. The multi-length leash according to claim 15, wherein the leash connector is removably secured to a receiving closed bracket of a collar, a halter, or a harness.

18. The multi-length leash according to claim 15, wherein the first region of the line member is made of nylon mesh, twine rope, leather, rubber cord, or chain link, wherein the handle and the second region of the line member is made of nylon mesh, twine rope, leather, rubber, or chain link sheathed by a padded material.

* * * * *